Patented Aug. 14, 1934

1,969,890

UNITED STATES PATENT OFFICE 1,969,890

PROCESS OF PREPARING PHENOL-FURFURAL CONDENSATION PRODUCTS

Franz Kurath, Chicago, Ill., assignor to Economy Fuse and Manufacturing Company, Chicago, Ill., a corporation of New York No Drawing. Application January 24, 1929, Serial No. 334,866

6 Claims. (Cl. 260—2)

This invention relates to synthetic resins of the type obtained by causing phenolic substances to react with furfural and particularly to synthetic resins produced by the condensation of phenols with furfural in the presence of a basic condensing agent.

This invention also relates to a process for producing synthetic resins of the above described type.

An object of this invention is to provide a novel synthetic resin and a new and improved process for producing said resin.

Another object is to effect economies in the process of preparing these resins.

It is well known in the art that phenolic bodies will react with furfural in the presence of basic condensing agents to form either fusible or infusible products, depending upon the ratio of furfural to phenol and upon the duration of the heat treatment.

Inasmuch as reactions of this character require extended periods of heat treatment, it has become the ordinary practice to conduct the heat treating action in a reflux condenser, so as to prevent the loss of the constituent substances due to evaporation. Accordingly, it has been customary in preparing resins from phenol and furfural, to heat the components in the presence of a basic condensing agent, such as caustic soda in a flask equipped with a reflux condenser until the desired amount of furfural has reacted.

In practice however, this reaction proceeds quite slowly and frequently several hours are required for the complete reaction of 75 parts of furfural with 100 parts of phenol.

It has been found that the speed of the reaction may be increased by increasing the amount of catalytic agent employed, but on the other hand, too great an increase in the amount of catalytic agent produces a product less suitable for electric insulating uses. The slowness of this reaction is found to be attributable chiefly to the lowering of the boiling point of the mixture as the reaction proceeds due to the presence of an increasingly larger amount of water which is formed as a result of the condensation action.

It is obvious that as the amount of water increases, the boiling point of the mixture is increasingly lowered, which prevents the application of heat as rapidly as is desired, to produce the completed products of condensation. In cases where the temperature must be reduced, the heat treatment must be increasingly prolonged.

It has been found that the rate of the reaction may be approximately doubled, if the water formed as the result of the reaction is removed. The removal may be accomplished by arranging the condenser on the reaction flask so as to permit escapement of the water, while effecting a condensation and return the vaporized furfural. With a given condenser, this practice requires very careful heat control in order that the process may be carried on economically and efficiently. The degree of care required renders the process less desirable than the process of the present invention as it is found in cases where the heating is proceeded with too rapidly, that the furfural vapors will escape and be lost and on the other hand, if the heating is accomplished too slowly, that some of the water vapor will be condensed and returned to the flask along with the returned and condensed furfural.

In view of the need in this art for a process producing a greater degree of satisfaction, it has also been proposed to cause furfural and phenol to react by heating them in an autoclave. By means of the increased pressures produced in this method, the boiling point of the furfural-phenol mixture can be raised somewhat over ordinary practice whereby an increased ratio of reaction may be obtained. Whereas this process has some advantages, it has been found that autoclave operations at high pressures are relatively expensive and the rate of reaction so obtained is not sufficiently greater or so readily controlled as to make it more desirable than the process involved in this invention.

In accordance with the present invention, it has been found that by conducting the phenol-furfural reaction in the presence of a basic condensing agent and under conditions of distillation, that a greatly increased rate of reaction is obtained. By conditions of distillation is meant, conditions wherein products which are vaporized during the heating process are permitted to pass off and become segregated from the remaining mixture undergoing the heat treatment.

Accordingly, the present invention may be illustrated in the process in which phenol, furfural and a condensing agent are heated in a vessel so arranged that the vapors formed may escape into a condensing chamber, whereby they are condensed and removed from the sphere of the reaction. By this method, the water formed as a result of the reaction, is removed as fast as it is produced, whereby the boiling point of the reaction mixture is not lowered by the presence of uncombined water. Consequently, under the present invention, the mixture may be heated to a much higher temperature than when a reflux condenser is employed.

Of course, furfural, and phenol, have quite large vapor tensions at these temperatures and some of these materials are volatilized with water. However, they are easily recovered from the liquid condensate and no loss of material occurs. Under the preferred conditions, the amount of furfural volatilized greatly exceeds the amount of phenolic body distilled off. In fact the amount of the latter distilled off is so small that it need not be specially taken into account in formulating the original mixture.

For illustrative purposes, one specific embodiment of this invention will be described, it being understood that these may be varied widely by those skilled in the art without departing from the spirit of the invention.

Into a distilling flask equipped with a water-cooled condenser and receiver, are introduced 188 parts by weight of phenol and 10 parts by weight of 10% caustic soda solution. The mixture is heated until the water present in the caustic soda solution has been distilled off. Then 184 parts by weight of furfural are introduced and the mixture is so heated that a fairly constant rate of distillation is maintained. After about one hour, 17 parts by weight of furfural are added to replace that lost by distillation. The distillation is continued until the amount of water distilled over into the receiver closely approximates the quantity theoretically liberated by the complete condensation of the furfural with the phenol. In this particular example under the conditions of heating preferably employed, about 24 parts by weight of furfural may be recovered from the distillate. The maximum temperature of the mass in the reaction flask is 184° C.

The product is an extremely viscous mass which cools to a dark brown, brittle fusible, soluble resin. It contains substantially no uncombined furfural. It may be employed in any of the ways in which resins of the shellac substitute type may be employed. It may also be incorporated with methylene hardening agents such as hexamethylinetetramine to form a heat endurable composition. By admixture of known fillers with the above heat hardening composition, molding compositions suitable for commercial hot molding operations may be prepared. I have obtained by this method, molded objects possessing greater strength than that of objects made from similar compositions, the fusible resin component of which has been made by known methods.

Of course, other bases than caustic soda may be employed as is well known.

I claim:

1. A quick setting resin formed by reacting phenol with furfural in the presence of a basic condensing agent while distilling the mixture.

2. The process which consists in heat treating phenol and furfural in the presence of a basic condensing agent whereby to cause a reaction therebetween, permitting any vaporized substances to escape and segregating any such vaporized material, and subsequently adding an additional amount of furfural.

3. The process which consists in treating with heat to produce a reaction and to distill the mixture, a phenol and furfural in the proportion of substantially one hundred and eighty-eight parts by weight, of phenol to one hundred and eighty-four parts by weight, of furfural, in the presence of approximately ten parts by weight, of ten per cent caustic soda solution, continuing said heat treatment for approximately one hour, then adding substantially seventeen parts by weight, of furfural, then continuing said heat treatment until the amount of water distilled off closely approximates the quantity theoretically liberated by the complete condensation of the used quantities of a phenol and furfural.

4. A quick setting resin of improved strength produced by the process defined in claim 3.

5. The process which consists in bringing together the following substances only; phenol, furfural, and a basic condensing agent; and then reacting the mixture so provided to produce a viscous mass while distilling the mixture during the entire reaction period.

6. The process which consists in bringing together the following substances only; phenol, furfural and a basic condensing agent; and then heating the mixture so produced to cause a reaction and forming thereby, a viscous mass while distilling the mixture during the entire reaction period.

FRANZ KURATH.